Feb. 19, 1952      O. RINDE      2,586,564
EDUCATIONAL TOY
Filed July 30, 1949      2 SHEETS—SHEET 1
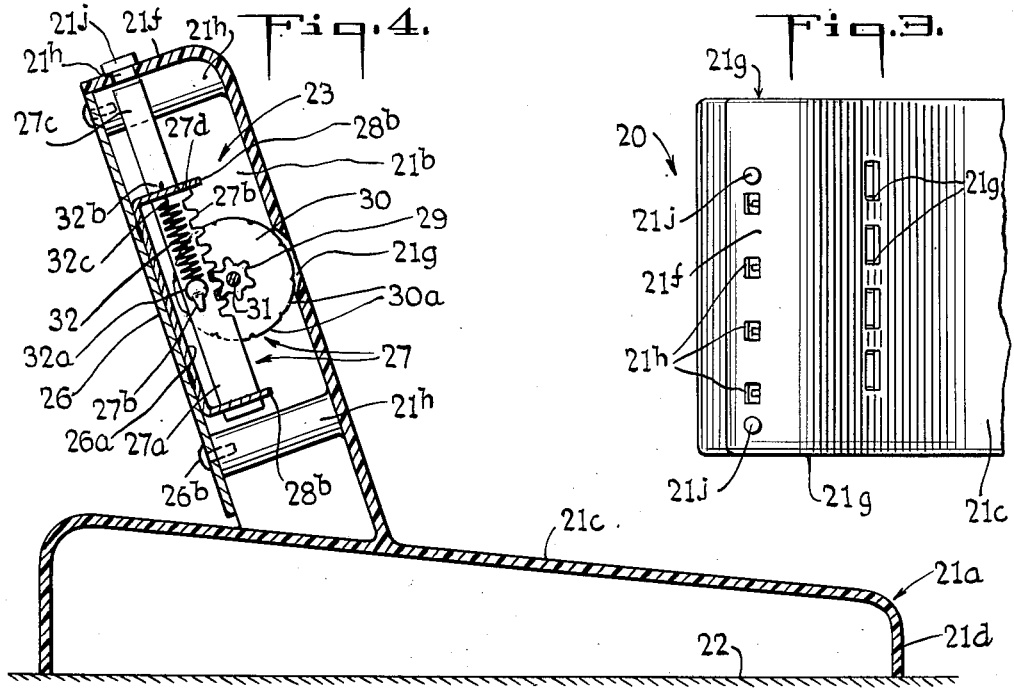
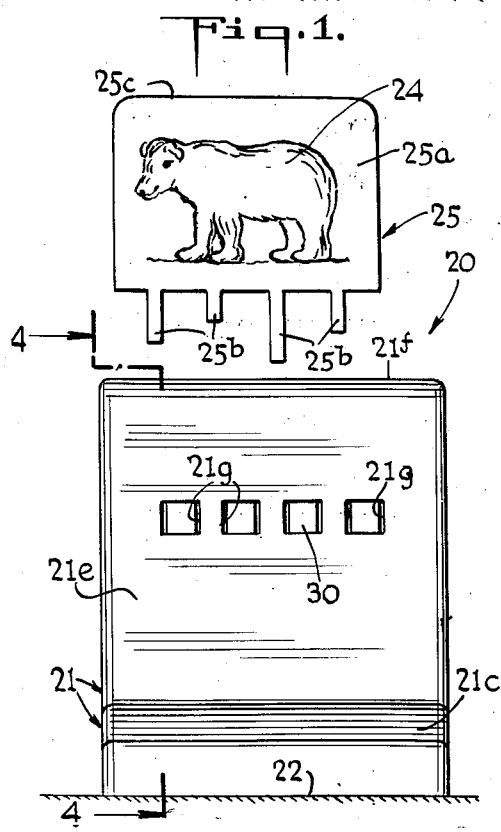
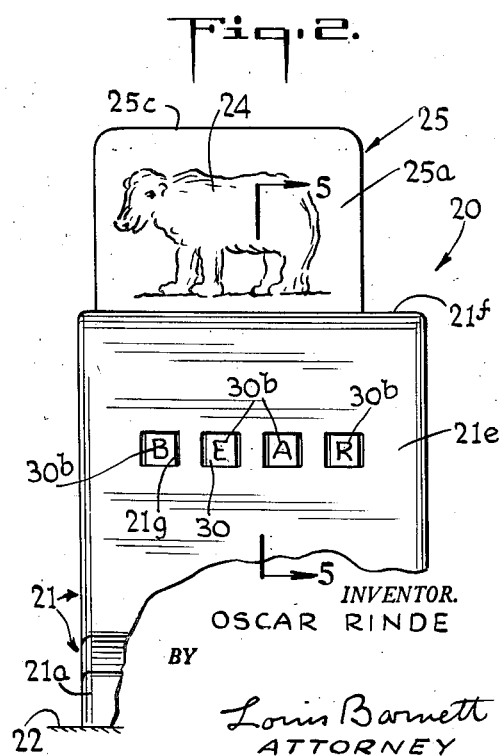
INVENTOR.
OSCAR RINDE
BY
*Louis Barnett*
ATTORNEY Feb. 19, 1952
O. RINDE
2,586,564
EDUCATIONAL TOY
Filed July 30, 1949
2 SHEETS—SHEET 2
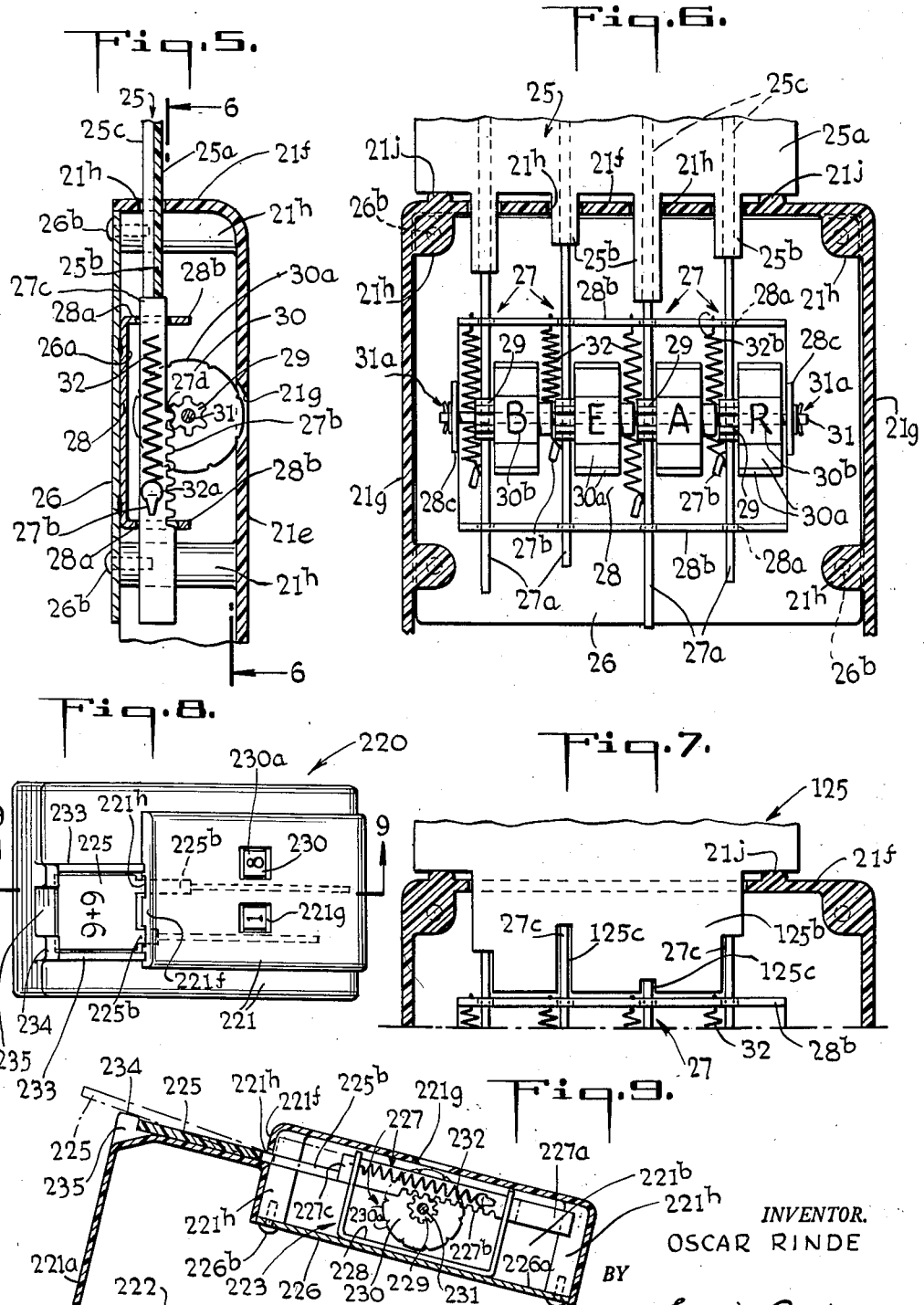
INVENTOR.
OSCAR RINDE
BY Louis Barnett
ATTORNEY Patented Feb. 19, 1952

2,586,564

UNITED STATES PATENT OFFICE 2,586,564

EDUCATIONAL TOY

Oscar Rinde, New York, N. Y.

Application July 30, 1949, Serial No. 107,744

3 Claims. (Cl. 35—9)

This invention relates to educational toys and more particularly is directed to an improved toy for teaching children and adults an elementary science or educational subjects, such as arithmetic or spelling, as for example, in teaching languages and spelling, alphabet letters in sequence being automatically set up into words corresponding to a picture representation carried by an operating key member.

Among the objects of the invention is to generally improve educational toys of the character described which shall comprise few and simple parts that are readily assembled to form a neat, attractively appearing toy of rugged construction to withstand rough usage, which shall be cheap to manufacture, which shall require a minimum of skill to operate even by a child of tender age, which shall automatically and positively spell out a word corresponding to a picture, or to give the correct answer to an illustrated elementary scientific question on selectively inserting an operating key member, and which shall be practical and efficient to a high degree in use.

Other objects of this invention will in part be obvious and in part thereinafter pointed out.

The invention accordingly consists in the features of construction, combination of elements, arrangement of parts, as exemplified in the toys hereinafter described and of which the scope of application will be indicated in the claims following.

In the accompanying drawing in which various possible illustrative embodiments of the invention are shown:

Fig. 1 is a front elevational view of an educational toy constructed to embody the invention showing the key member positioned in spaced alignment just prior to being inserted for automatically spelling a word corresponding to a picture carried by said member, here shown as a bear.

Fig. 2 is a front elevational view like Fig. 1 showing the key member fully inserted to form a predetermined sequence of alphabet letter setting up, B-E-A-R corresponding to the picture carried by said member.

Fig. 3 is a fragmentary top plane view of the toy construction shown in Figs. 1 and 2 with the key member removed.

Fig. 4 is an enlarged cross-sectional taken on line 4—4 in Fig. 1 showing details of the interior construction of the toy.

Fig. 5 is an enlarged fragmentary view taken on line 5—5 in Fig. 2 showing detail of the toy construction in said setting-up position of the sequence of alphabet letters corresponding to the picture carried by the key member.

Fig. 6 is a fragmentary cross-sectional view taken on line 6—6 in Fig. 5 showing the toy mechanism with the key member in effective actuating position to automatically spell out B-E-A-R.

Fig. 7 is a fragmentary cross-sectional view showing a modified construction embodying the invention directed to a different form of key member structure.

Fig 8. is a top plan view showing a modified educational toy construction embodying the invention for teaching elementary science, such for example, arithmetic, and Fig. 9 is a cross sectional view taken on line 9—9 of Fig. 8 showing details of the interior construction.

Referring in detail to the drawing 20 denotes an educational toy for teaching children or adults an elementary science or educational subjects and as here shown for teaching language and spelling constructed to embody the invention.

As seen in Figs. 1 to 4, device 20 may comprise a casing 21 formed with sturdy base 21a for resting on a suitable horizontal extending surface or table top 22 and an upstanding compartment 21b inclined in angular relation to said base 21a as shown in Fig. 4, in which a mechanism 23 is housed for visually indicating intelligent results, as for example, spelling a word, shown in Fig. 2, as a sequence of alphabet letters automatically set up, as B-E-A-R corresponding to a figure picture 24 of a bear carried on a front side 25a of an operating key member 25 when the latter is effective to actuate said mechanism 23 in the manner hereinafter described, and as shown in Fig. 2

Casing 21 may be made of any suitable sheet material or may be molded of plastic so that base 21a is a hollow structure having a sloping top wall 21c and upright side walls 21d integrally formed therewith. As shown in Fig. 4, if desired front wall 21e, top wall 21f and side wall 21g of compartment 21b may also be made integral to extend up from base top wall 21c.

For strengthening the casing structure and to serve as an anchorage for a rear closure wall panel 26, said compartment 21b may have spaced fillet bosses 21h against which said closure wall panel 26 is removably mounted by suitable means, such as, fastening screws 26b Mounted against an interior side 26a of said removable panel 26 is mechanism 23 which is seen from Figs. 4 to 6 to comprise a plurality of unit assemblies 27 of identical construction arranged in side-by-side parallel alignment, said assemblies 27 having a common frame or cradle 28 on which spaced apart rod racks 27a of said assemblies 27 are mounted and guided for independent reciprocating movement through aligning opening 28a in out turned end portions 28b of said frame 28.

Each assembly rod rack 27a may be provided with a row of teeth 27b which mesh with a pinion 29 mounted to turn with a wheel 30 on a common fixed shaft 31, the latter being suitably mounted on spaced apart bearing bracket arms 28c carried by said frame 28. Suitable means such as washers and cotter pins 31a retain said shaft 31 from movement with respect to said bracket arms 28c, as is clear from Fig. 6.

Normally each rod rack 27a of assembly 27 is retained in an elevated position showing in Fig. 1, against a suitable stop as at 27d by a tension spring 32, one end 32a of which is detachably secured to tab 27b of strip material from which said rod rack 27a is formed. The other spring end 32b may be anchored to frame end portion 28b as at 32c.

The wheel 30 may have its peripherial surface uniformly divided into space 30a each of which carries a desired indicating means 30b, as for example, in a toy for teaching spelling, one of a series of different alphabet letters, but for teaching an elementary science, such as arithmetic, series of numerals or numbers.

The peripheral spaces 30a and indicating means 30b on wheels 30 may be constructed and arranged to be visible through compartment front wall 21e if opaque, by any suitable means such as providing spaced windows 21g as shown in Figs. 1, 2 and 5.

Compartment top wall 21f may be perforated with spaced passageways or holes 21h aligned with upper ends 27c of rod-racks 27a as is clear from Figs. 1, 5 and 7. Each extension actuator 25b may be of T-cross sectional shape having a longitudinal rib 25c thereof extending to have the leading end thereof abut against extreme end 27c of rod-rack 27 when said actuators 25a are inserted into passageway 21h for selectively depressing rod-racks 27a, for example, from their normally elevated position shown in Fig. 4 to that shown in Figs. 5 and 6.

Each key member 25 on handle portion 25c may carry figure picture 24 and has lengths of the extension activators 25a patterned to correspond to said picture 24 so that, for example, key member 25 is effective to actuate mechanism 23 for automatically setting up B-E-A-R on the successive wheel indicating means 30b as seen through windows 21g when key member is fully inserted from position shown in Fig. 1 to that shown in Fig. 2.

It should be noted that said unit assemblies 27 by including drives with pinions 29 and wheels 30 as described above give relative ratios of movement, as here shown, of about four to one and thereby permit construction of key member actuators 25b shorter and more compact than would be otherwise possible.

It has been found that when mechanism 23 of toy 20 includes only four unit assemblies 27, wheel peripheral spaces 30a thereof each may extend along one-eighth of the circumference of the wheel 30 and when used to teach spelling may carry indicating means 30b in the series of different alphabet letters on each wheel 30 as is clear from Figs. 1, 2 and 6, and in sequence as herein below tabulated.

| Wheel extreme left | Wheel next to extreme left | Wheel next to extreme right | Wheel extreme right |
|---|---|---|---|
| G C D B P L H (blank) | A E I O U Y L (blank) | C G T W A O M (blank) | K L R T N B A (blank) |

By selectively varying the relative lengths of the actuators 25a they may be made to effectively depress rod racks 27a for turning wheels 30 to cause individual letters to appear at window 21g automatically spelling-out such words, BEAR, DUCK, GOAT, PIG, CAT, DOG etc., corresponding to appropriate pictures 24 sought to be associated therewith.

The practical application of the invention will now be apparent. After constructing and assembling casing 21, and mechanism 23 with panel 26 and units assemblies 27 as described above and showing in Figs. 1, 3 and 4, a desired number of different key members 25, are provided each having a figure picture 24 and spaced apart extension actuators 25b of selective varying lengths patterned to depress successive rod racks 27a so that wheels 30 turned thereby causing B-E-A-R to automatically appear at window openings 21g in the construction here illustrated. Aligned leveling spaced protuberances or stops 21j may be provided to extend from the exterior of compartment wall 21f against which the key members 25 abut to assure proper registering and depression of the rod racks 27a with said actuators 25b as it clear from Figs. 3, 4, 6 and 7.

Normally only blank spaces of wheels 30 will be visible at said window 21g due to the action of springs 32 as shown in Figs. 1, 3 and 4, but on fully inserting extension actuator 25b of key member 25 in passageway 21h of compartment wall 21f, the wheels 30 will be turned by the rack and pinion operation against the action of said spring 32 resulting in automatically spelling the word BEAR corresponding to a figure picture 24 of a bear of key member 25.

Other key members 25 having different patterns of actuator lengths may be provided to automatically spell other words, such as Duck, Goat, Cat, etc., corresponding to other figure pictures 24, respectively, on different key members.

It is also contemplated to teach elementary scientific subjects, such as arithmetic in practising the invention, for example, additions, subtractions, multiplications or division by providing appropriate figure symbol pictures 24 on key members 25 and corresponding wheel indicia 30b automatically made visual by proper lengths of actuator 25b of different appropriate patterns.

It is to be understood that the number of unit assemblies 27 of mechanism 23 may be increased or diminished as desired to suit the range of requirements for which the toy 20 is to be used.

A modified form of key member 125 is shown in Fig. 7. Instead of using a pattern of extension actuators 25b as described above, the actuation of the rod-racks 27a may be accomplished by providing an extension portion 125b having recesses or grooves of 125c of various depths for abutting extreme upper ends 27c of the rod-racks 27a to depress the latter in the identical manner as described above for the extension actuators 25a.

For teaching elementary sciences such as arithmetic modified toy construction 220, embodying the invention, shown in Figs. 8 and 9 may be used.

Toy construction 220 as here shown may comprise casing 221 which has a base portion 221a formed with a compartment 221b extending therein. Said compartment 221b may have fillet bosses 221h against which rear closure panel 226 is secured by fastening screws 226b.

Mechanism 223 like mechanism 23 of toy 20 described above is carried on the interior side 226a of panel 226, said mechanism 223 here shown requiring only two unit assemblies 227 arranged in side by side parallel alignment on common frame or cradle 228, the latter supporting rod-racks 227a for independent reciprocating movement in the same manner as described above for unit assemblies 27. Each rod-rack 227a has teeth 227b meshing with pinion 229 mounted to turn with wheel 230 on common shaft 231, the latter being mounted on bracket arms of frame or cradle 228 in the same manner as described above for shaft 31, the movement of said rod-racks 227a being retained in an extended position by tension spring 232 as in the unit assembly 27 of toy 20.

Wheel 230 of each assembly 227 may have ten peripheral spaces 230a each carrying numerals "1," "2," "3," "4," "5," "6," "7," "8," "9" and "0," arranged to be visible through window 221g. Compartment wall 221c may be perforated with passageway 221h aligning with upper ends 227c of rod-racks 227a so as to be in position to be depressed by extension actuator 225b of key numbers 225.

Each key member 225 may carry an arithmetic problem here shown as "9+9" and when key 225 is effective to actuate mechanism 223 for automatically setting up the answer "18" on the successive wheel indicating means, as seen in window 221g shown in Fig. 8.

The construction of toy 20 requires key members 25 to be manually held in fully inserted position to be effective. However, if desired, toy constructions 25 or 225 may be made as shown in Fig. 9 with spaced guide ramps 233 between which the key members 225 slide, and top spaced apart edge stops 234 may be provided to self-retain the key member 225 when in fully inserted position, that is, when moved from the dot and dash line position to full line position, shown in Fig. 8. A finger well 235 may be provided between said stops 234 to facilitate the removal of the key members 225 from its retained position, as is clear from Fig. 9. Said spaced guide ramps 233, stops 234 and finger well 235 may be integrally molded as part of casing 221.

From Fig. 9 it will be noted that the unit assemblies 227 are mounted on cradle 228 in a relatively upside down relation with respect to that shown for unit assemblies 27 in Figs. 4 and 5 to provide a more compact structure and to bring the self-retaining key member feature into improved arrangement when desired.

Toy construction 220 is used in the same manner as described for toy 20 with either key member 25 or 125 but lends itself to the use in double capacity as each key member 225 may carry a problem on each reverse side thereof. Thus in key member 225 shown in Fig. 8, if the same is turned over and inserted "81" would appear at window 221g which would automatically solve the problem "9×9," in the well understood manner (not shown) that is, each key member 225 has double utility.

Toy 20 can also have key members 25 used in such double capacity but to limited extent thus an owl's picture 24 can be made to indicate O-W-L and when reversed may show a cow's picture and spell out C-O-W.

It is thus seen that there is provided an improved toy for teaching educational subjects of the character described whereby the several objects of this invention are achieved and which is well adapted to meet all conditions of practical use.

As various possible embodiments may be made in the above invention for use for different purposes and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. In an automatic toy, a key operated means for visually indicating various predetermined intelligible results, demountably interchangeable flat key members each carrying an intelligible symbol referring to one of said predetermined result, said key members each having actuating means coordinated into a pattern corresponding to each of said symbols with respect to said result for inserting into said indicating means to selectively render said result intelligibly visible, a casing for said key operated means, said casing having passageways for receiving said actuating means, spaced apart ramps for guiding said actuating means to align with the passageways, projecting stop means extending adjacent said ramps for retaining the key members in operating effective position, and a finger well provided in the casing structure between said ramps to facilitate removal and insertion of said key members from said effective positions.

2. In an automatic toy, as defined in claim 1, in which key operated means includes a plurality of coaxially arranged wheels, a pinion mounted to turn each of said wheels, rod-racks mounted to reciprocate by operation of said actuating means and meshing with said pinions, said wheels having peripheral spaces for carrying the symbols.

3. In an automatic toy defined in claim 1, in which said key operated means includes a plurality of coaxially arranged wheels, a pinion mounted to turn each of said wheels, rod-racks mounted to reciprocate by operation of said actuating means and meshing with said pinions, said wheels having peripheral spaces for carrying the symbols, and a demountable rear closure panel for said casing supporting the key operated means in effective alignment with said passageways.

OSCAR RINDE.

REFERENCES CITED

The following references are of record in the file of this patent:

UNITED STATES PATENTS

| Number | Name | Date |
| --- | --- | --- |
| 342,737 | Dougherty | May 25, 1886 |
| 1,208,919 | Corell | Dec. 19, 1916 |
| 1,343,095 | Smith | June 8, 1920 |
| 1,902,971 | Rippon | Mar. 28, 1933 |
| 2,127,769 | Esgro | Aug. 23, 1938 |
| 2,132,412 | Gollwitzer | Oct. 11, 1938 |